US012730043B2

(12) United States Patent
Eda et al.

(10) Patent No.: US 12,730,043 B2
(45) Date of Patent: Sep. 8, 2026

(54) TANK INSPECTION METHOD

(71) Applicant: TOYOTA JIDOSHA KABUSHIKI KAISHA, Toyota (JP)

(72) Inventors: Akinori Eda, Nagakute (JP); Takashi Usui, Toyota (JP); Kei Kato, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 18/408,884

(22) Filed: Jan. 10, 2024

(65) Prior Publication Data

US 2024/0272053 A1 Aug. 15, 2024

(30) Foreign Application Priority Data

Feb. 9, 2023 (JP) ................................ 2023-018072

(51) Int. Cl.

| | |
|---|---|
| ***G01N 3/12*** | (2006.01) |
| ***G01B 13/22*** | (2006.01) |
| ***G01M 3/02*** | (2006.01) |
| ***G01M 3/26*** | (2006.01) |
| ***G01M 3/32*** | (2006.01) |

(52) U.S. Cl.

CPC ............... *G01N 3/12* (2013.01); *G01B 13/22* (2013.01); *G01M 3/027* (2013.01); *G01M 3/26* (2013.01); *G01M 3/3236* (2013.01); *G01N 2203/0048* (2013.01); *G01N 2203/0617* (2013.01)

(58) Field of Classification Search

CPC ............. G01N 3/12; G01N 2203/0048; G01N 2203/0617; G01M 3/26; G01M 3/3236; G01M 3/027; G01B 13/22

USPC .............................................................. 73/37

See application file for complete search history.

(56) References Cited

U.S. PATENT DOCUMENTS 4,787,772 A * 11/1988 Wagner ................... G01M 3/02 405/129.5
2021/0149399 A1* 5/2021 Lodhi ................. G05D 1/0088
2022/0244130 A1* 8/2022 Shintaku ............ G01M 3/2815

(Continued)

FOREIGN PATENT DOCUMENTS

JP 2004117291 A * 4/2004
JP 2006292557 A * 10/2006

(Continued)

*Primary Examiner* — Stephanie E Bloss
*Assistant Examiner* — Kevin C Butler
(74) *Attorney, Agent, or Firm* — Dickinson Wright, PLLC

(57) ABSTRACT

Provided is a tank inspection method capable of efficiently draining water injected into a tank at the time of inspection. A tank inspection method TIM includes a supporting step, a water injection step, a pressure increasing step, and a draining step. The supporting step supports a tank with the central axis crossed with the horizontal plane such that openings provided at both ends in a direction along the central axis of the tank become upper and lower openings. The water injection step injects water into the tank from the lower opening and discharges air inside the tank from the upper opening. The pressure increasing step increases water pressure inside the tank to a predetermined pressure by pumping water to the lower opening, with an upper valve, which opens and closes an upper flow path, closed, and the draining step drains water from the lower opening of the tank.

3 Claims, 3 Drawing Sheets

(56) References Cited

U.S. PATENT DOCUMENTS

| | | | | |
|---|---|---|---|---|
| 2024/0272053 | A1* | 8/2024 | Eda | G01N 3/12 |
| 2024/0328890 | A1* | 10/2024 | Vaganay | G01N 17/04 |

FOREIGN PATENT DOCUMENTS

| | | | | | |
|---|---|---|---|---|---|
| JP | 4026176 | B2 | * | 12/2007 | |
| JP | 2013228022 | A | * | 11/2013 | |
| JP | 2016176735 | A | * | 10/2016 | |
| JP | 2017125733 | A | | 7/2017 | |
| JP | 2019032217 | A | * | 2/2019 | |
| JP | 6596210 | B2 | * | 10/2019 | |
| JP | 2020030100 | A | * | 2/2020 | |
| JP | 6852619 | B2 | * | 3/2021 | |
| JP | 2021085758 | A | * | 6/2021 | |
| JP | 2023034428 | A | * | 3/2023 | |
| JP | 7367949 | B2 | * | 10/2023 | |
| JP | 2023170126 | A | * | 12/2023 | |
| JP | 7434646 | B1 | * | 2/2024 | |
| WO | WO-2024186342 | A1 | * | 9/2024 | B62D 57/024 |

* cited by examiner

Air supply at plant
High-pressure pump
100
101
101a
101h
102
103
104
105
106
111
111b
111c
111f
111h
111p
111w
112
112r
113
113r
114
114f
114o
114p
114t
115
115a
116
116d
116f
T
T1 (T1t)
T1 (T1b)
T4
Ta
P

TANK INSPECTION METHOD

CROSS REFERENCE TO RELATED APPLICATIONS

The present application claims priority from Japanese patent application JP 2023-018072 filed on Feb. 9, 2023, the entire content of which is hereby incorporated by reference into this application.

BACKGROUND

Technical Field

The present disclosure relates to a tank inspection method.

Background Art

Conventionally, a tank inspection method has been known in which water is injected into a tank to increase the pressure inside the tank (see JP 2017-125733 A).

SUMMARY

The present disclosure provides a tank inspection method capable of efficiently draining water injected into a tank at the time of inspection.

An aspect of the present disclosure is a tank inspection method including the steps of: supporting a cylindrical tank, with a central axis of the tank crossed with a horizontal plane such that openings provided at both ends in a direction along the central axis of the tank become an upper opening and a lower opening; injecting water in which water is injected into the tank from the lower opening of the tank supported in the supporting and air inside the tank is discharged from the upper opening; increasing pressure in which water pressure inside the tank, filled with water in the injecting water, is increased to a predetermined pressure by pumping water to the lower opening, with an upper valve closed, the upper valve adapted to open and close an upper flow path connected to the upper opening of the tank; and draining water in which water is drained from the lower opening of the tank after the increasing pressure ends.

In the draining water, air may be pumped to the upper opening of the tank.

In the injecting water, the upper valve may be closed when bubbles contained in water flowing through the upper flow path are no longer detected.

The tank includes, for example, a cylindrical body which is larger in diameter than the openings at both ends in the direction along the central axis and a funnel-shaped shoulder portion which is provided between each of the openings and the body and whose diameter decreases toward each of the openings. Further, in the supporting, an angle between the central axis of the tank and the horizontal plane is set, for example, within an angle range that can be moved upward in a vertical direction toward the upper opening along a route on an inner surface of the shoulder portion that connects any point on the inner surface of the shoulder portion and the upper opening at a shortest distance.

According to the aforementioned aspects of the present disclosure, it is possible to provide a tank inspection method capable of efficiently draining water injected into a tank at the time of inspection.

DETAILED DESCRIPTION

Figure 1:
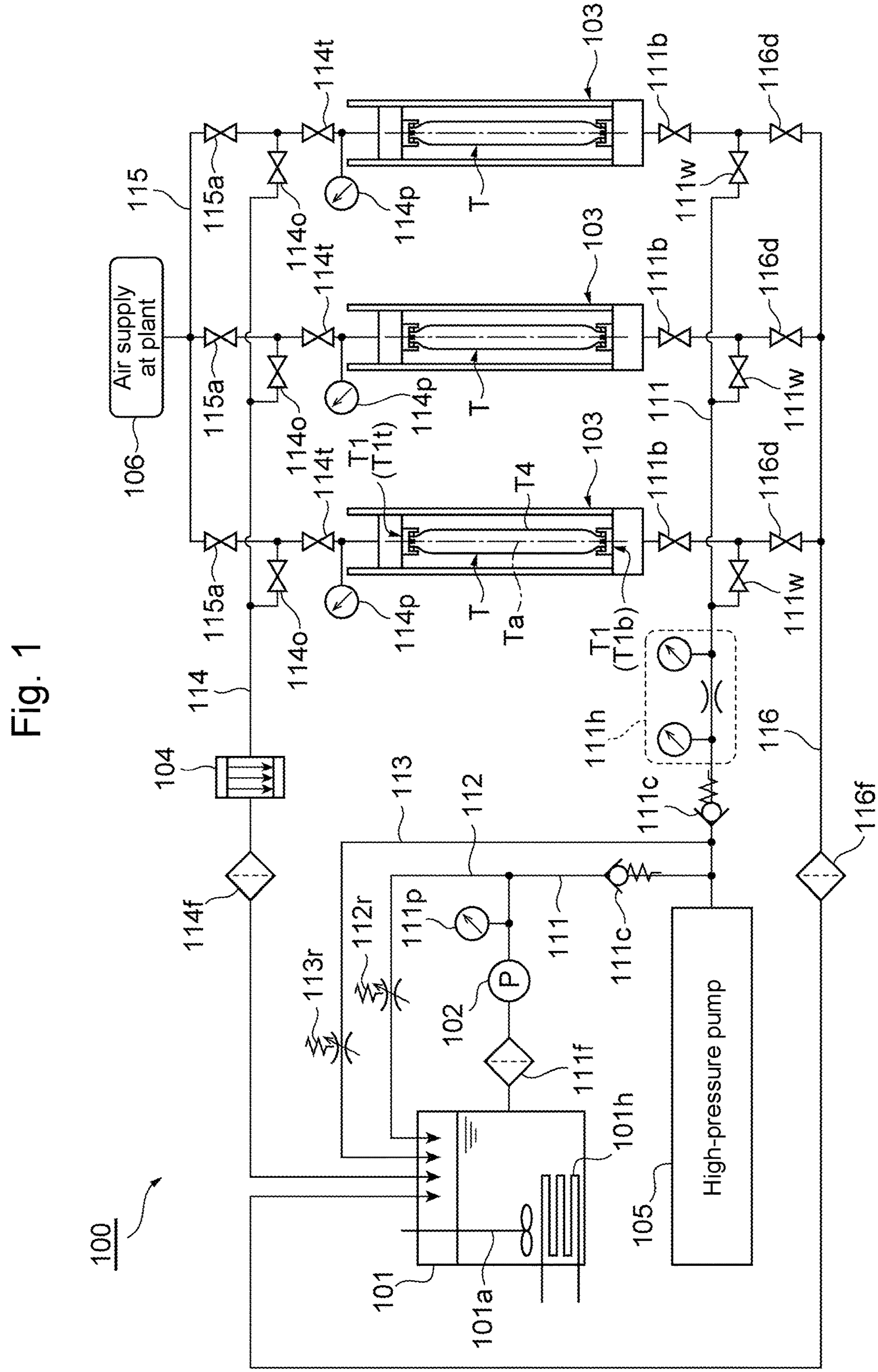
FIG. 1 is a process flow diagram of an inspection device showing an embodiment of a tank inspection method of the present disclosure.

Hereinafter, an embodiment of a tank inspection method according to the present disclosure will be described referring to the drawings.

Figure 2:
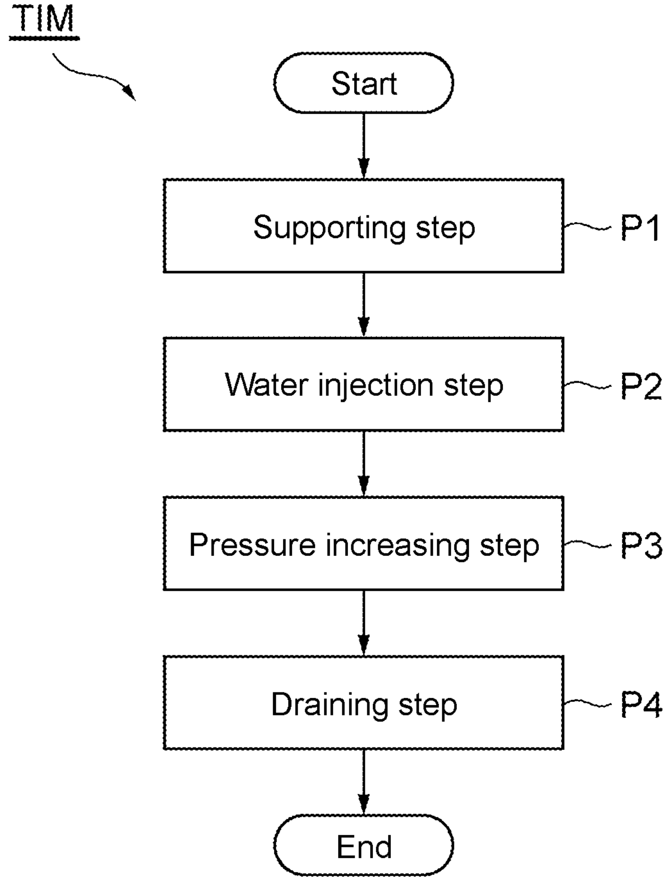
FIG. 2 is a flow chart showing the embodiment of the tank inspection method of the present disclosure.

FIG. 1 is a process flow diagram of an inspection device 100 showing an embodiment of a tank inspection method according to the present disclosure. FIG. 2 is a flow chart showing the embodiment of the tank inspection method according to the present disclosure. In a tank inspection method TIM of the present embodiment, a tank T to be mainly inspected is, for example, a plurality of small-diameter high-pressure hydrogen tanks to be mounted on a fuel-cell vehicle, but typical tanks can also be inspected.

The tank inspection method TIM of the present embodiment includes, for example, a supporting step P1, a water injection step P2, a pressure increasing step P3, and a draining step P4 shown in FIG. 2, and can be implemented by the inspection device 100 as shown in FIG. 1. The inspection device 100 includes, for example, a water tank 101, a low-pressure pump 102, one or more clamps 103, a bubble sensor 104, a high-pressure pump 105, and an air supply unit 106.

inspection device 100 can simultaneously inspect a plurality of tanks T by, for example, including a plurality of clamps 103 each supporting one tank T. Note that the number of the clamps 103 included in the inspection device 100, that is, the number of the tanks T that can be simultaneously inspected may be increased or decreased, for example, depending on the performance of the low-pressure pump 102 and the high-pressure pump 105 that pump water to each tank T via a water supply line 111.

The water tank 101 stores, for example, water that is used to inspect the tank T. The water tank 101 includes, for example, a heater 101*h* and an agitator 101*a* and maintains the temperature of the stored water in a predetermined temperature range. The low-pressure pump 102 is provided, for example, in the water supply line 111 that connects the water tank 101 and the clamps 103, and pumps water to each tank T via the water supply line 111.

A filter 111*f* is provided between the water tank 101 and the low-pressure pump 102 in the water supply line 111, for example. Further, a pressure gauge 111*p*, two check valves 111*e*, a differential pressure-type high-pressure flow meter 111*h*, a water supply valve 111*w*, and a lower valve 111*b* are provided between the low pressure pump 102 and each clamp 103 in the water supply line 111, for example.

Further, a low-pressure return line 112 branches between the pressure gauge 111*p* and the check valve 111*e* of the water supply line 111, and a high-pressure return line 113 branches between the two check valves 111*e* of the water supply line 111, the return lines each extending to the water tank 101. A low-pressure regulator 112*r* and a high-pressure regulator 113*r* are provided in the low-pressure return line 112 and the high-pressure return line 113, respectively.

Figure 3:
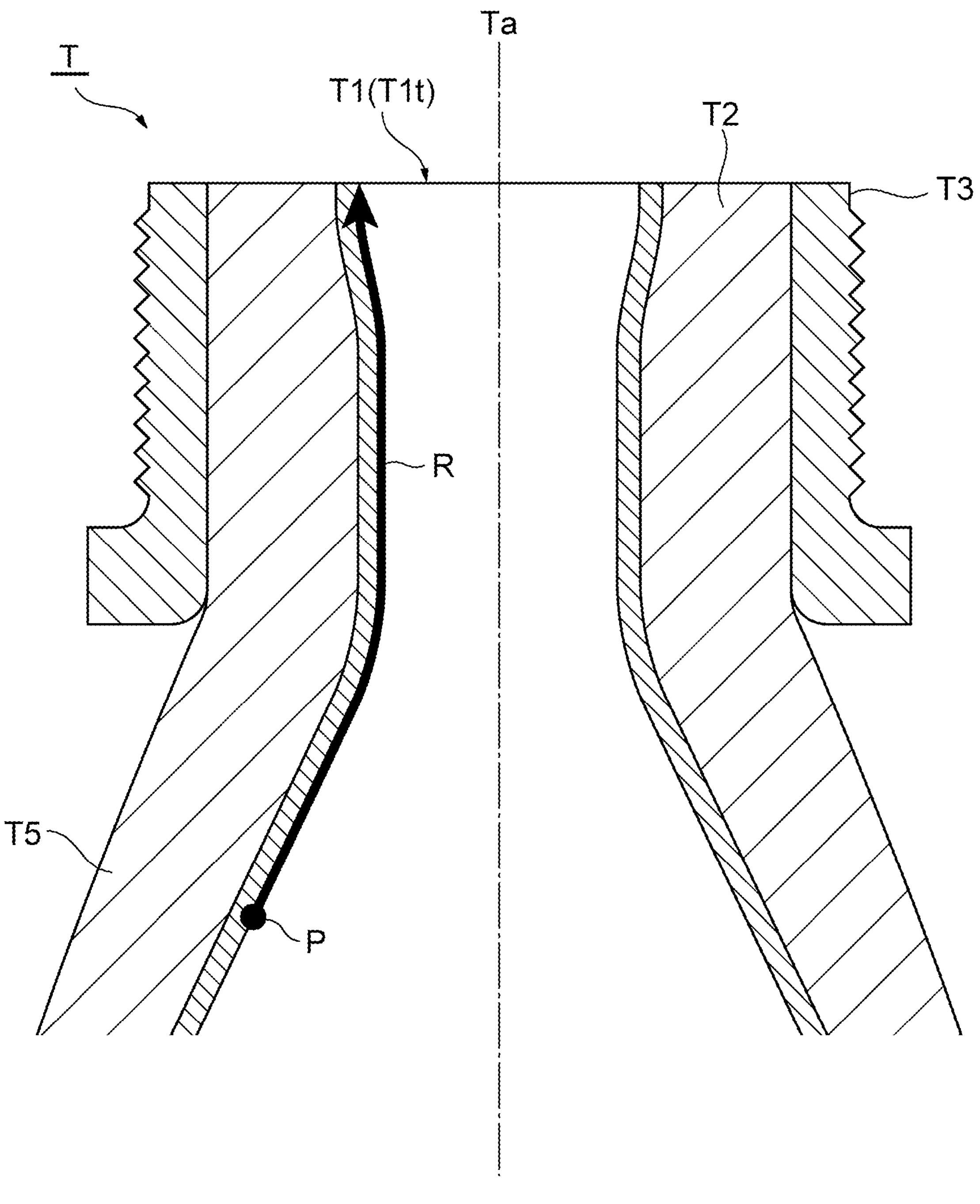
FIG. 3 is a cross-sectional view showing an example of a tank to be inspected of the inspection method shown in FIG. 2.

FIG. 3 is a cross-sectional view showing an example of the tank T to be inspected of the tank inspection method TIM of the present embodiment. The tank T has, for example, a generally cylindrical shape, with openings T1 each provided at one end and the other end in a longitudinal direction of the tank T along a central axis Ta of the tank T. The openings T1 open, for example, at ends of cylindrical neck-portions T2 provided at both ends in the longitudinal direction of the tank T.

A cylindrical base T3 having a screw on an outer periphery thereof is attached to the periphery of each neck portion T2 of the tank T, for example. As shown in FIG. 1 or FIG. 3, for example, the tank T also includes a cylindrical body T4 which is larger in diameter than the opening T1, and a shoulder portion T5 provided between each opening T1 and the body T4. For example, as shown in FIG. 3, the shoulder portion T5 has a funnel shape, a dome shape, or a truncated cone shape that decreases in diameter toward each opening T1.

As shown in FIG. 1, each clamp 103 of the inspection device 100 is connected, for example, on one side to the water supply line 111 and on the other side to an overflow line 114. The clamp 103 supports the tank T, for example, by holding both ends in the longitudinal direction along the central axis Ta of the tank T. More specifically, each clamp 103 supports the tank T, for example, with the bases T3 at both ends of the tank T clamped and with one opening T1 in communication with the water supply line 111 and the other opening T1 in communication with the overflow line 114.

Further, each of the clamps 103 supports the tank T with the central axis Ta of the cylindrical tank T crossed with the horizontal plane. More specifically, each of the clamps 103 supports the tank T upright, for example, such that the central axis Ta along the longitudinal direction of the tank T is vertically parallel and orthogonal to the horizontal plane. With the tank T supported by the clamp 103, the opening T1 provided at one end of the tank T and the opening T1 provided at the other end of the tank T become respectively a lower opening T1*b* located on a lower side in the vertical direction and an upper opening Tit located on an upper side in the vertical direction.

Note that when the tank T is supported by the clamp 103, the central axis Ta of the tank T does not necessarily have to be orthogonal to the horizontal plane. The clamp 103 can support the tank T, for example, such that the central axis Ta of the tank T has an angle within a predetermined range relative to the horizontal plane. Here, the angle range of the central axis Ta of the tank T relative to the horizontal plane can be set as follows.

First, as shown in FIG. 3, a route R on an inner surface of the shoulder portion T5 is assumed, the route R connecting any point P on the inner surface of the shoulder portion T5 on the upper side of the tank T and the upper opening T1*t* of the tank T at the shortest distance. Then, the angle of the central axis Ta of the tank T supported by the clamp 103 relative to the horizontal plane is set within a range that can be moved upward in the vertical direction toward the upper opening T1*t* along the route R.

The overflow line 114 connected to the upper opening T1*t* of each tank T supported by each clamp 103 extends, for example, from each clamp 103 to the water tank 101. In the inspection device 100 of the present embodiment, the overflow line 114 forms an upper flow path connected to the upper opening T1*t* of the tank T, and the water supply line 111 forms a lower flow path connected to the lower opening T1*b* of the tank T.

The overflow line 114 is provided with, for example, a pressure gauge 114*p*, an upper valve 114*t*, an overflow valve 1140, the bubble sensor 104, and a filter 114*f*. The bubble sensor 104 detects, for example, the presence or absence of bubbles contained in the water flowing through the overflow line 114. As the bubble sensor 104, for example, a photoelectric-type, a capacitance-type, or an ultrasonic-type bubble sensor can be employed.

The high-pressure pump 105 is connected, for example, between the two check valves 111*e* of the water supply line 111. The high-pressure pump 105, for example, pumps water through the water supply line 111 to the lower opening T1*b* of each tank T to increase the water pressure inside the tank T to a predetermined pressure. The air supply unit 106 includes, for example, an air compressor, and pumps air to an air supply line 115.

The air supply line 115 branches into a plurality of branch lines at a branch point between the air supply unit 106 and the clamps 103, for example, and is connected between the upper valve 114*t* and the overflow valve 1140 of the overflow line 114. The air supply line 115 is provided with an air supply valve 115*a* in each branch line downstream of the branch point. Each air supply valve 115*a* opens and closes each branch line of the air supply line 115.

The inspection device 100 also has a drain line 116 that branches between the lower valve 111*b* and the water supply valve 111*w* of the water supply line 111 connected to each of the clamps 103 and that extends to the water tank 101. The drain line 116 is provided with, for example, a drain valve 116*d* and a filter 116*f*.

Hereinafter, the tank inspection method TIM of the present embodiment will be described in detail.

As shown in FIG. 2, when the tank inspection method TIM of the present embodiment is started, first, the supporting step P1 is performed. At the beginning of the supporting step P1, the water supply valve 111*w* and the lower valve 111*b* of the water supply line 111, the upper valve 114*t* and the overflow valve 1140 of the overflow line 114, the air supply valve 115*a* of the air supply line 115, and the drain valve 116*d* of the drain line 116, which are shown in FIG. 1, are closed.

In the supporting step P1, the tank T is supported on each of the clamps 103 with the central axis Ta of the cylindrical tank T crossed with the horizontal plane. More specifically, for example, the tank T is supported upright by each of the clamps 103, with the central axis Ta of the tank T orthogonal to the horizontal plane. Thus, the openings T1 provided at one end and the other end in the longitudinal direction of the tank T along the central axis Ta of the tank T become respectively the lower opening T1*b* and the upper opening T1*t* located respectively on the lower side and the upper side in the vertical direction.

In the supporting step P1, the angle between the central axis Ta of each tank T and the horizontal plane is, for example, within the aforementioned predetermined angle range. Here, the predetermined angle range is an angle range that can be moved upward in the vertical direction toward the upper opening Tit along the route R on the inner surface of the shoulder portion T5 that connects any point P on the inner surface of the shoulder portion T5 of the tank T shown in FIG. 3 and the upper opening T1*t* of the tank T at the shortest distance.

Next, the water injection step P2 is performed. In the water injection step P2, for example, the water supply valve 111*w* and the lower valve 111*b* of the water supply line 111 and the upper valve 114*t* and the overflow valve 1140 of the overflow line 114, which are shown in FIG. 1, are opened.

In addition, the low-pressure pump 102 is actuated to pump water from the water tank 101 through the filter 111*f*, the cheek valves 111*e*, the high-pressure flow meter 111*h*, the water supply valve 111*w*, and the lower valve 111*b* of the water supply line 111 to the lower opening T1*b* of each tank T.

As a result, water is injected into each tank T from the lower opening T1*b* of the tank T supported in the supporting step P1, and air inside the tank T is discharged from the upper opening T1*t* of the tank T. In the water injection step P2, when each tank T is filled with water, the water inside the tank T overflows from the upper opening T1*t* of the tank T, flows into the overflow line 114, passes through the filter 114*f*, and returns to the water tank 101.

In the water injection step P2, the bubble sensor 104 detects, for example, bubbles contained in the water flowing through the overflow line 114. The inspection device 100 closes the upper valve 114*t* of the overflow line 114, which is the upper flow path, connected to the upper opening T1*t* of each tank T, when bubbles are no longer detected by the bubble sensor 104. When a plurality of tanks T are continuously inspected, the water supply valves 111*w* and the lower valves 111*b* connected to the tanks T other than those connected to the tank T to be inspected first are closed.

Thereafter, the low-pressure pump 102 is stopped and the water injection step P2 ends. The water injection step P2 may be simultaneously performed on a plurality of tanks T or may be sequentially performed on the tanks T one by one. Note that when the water pressure of the water supply line 111 detected by the pressure gauge 111*p* exceeds a predetermined pressure, for example, the low-pressure regulator 112*r* of the low-pressure return line 112 opens, and water is discharged from the water supply line 111 to the water tank 101 via the low-pressure return line 112.

Next, the pressure increasing step P3 is performed. The pressure increasing step P3 is started with the upper valve 114*t* closed, the upper valve 114*t* adapted to open and close the overflow line 114, which is the upper flow path, connected to the upper opening T1*t* of the tank T filled with water after the water injection step P2 ends. In the pressure increasing step P3, the high-pressure pump 105 pumps water to the lower opening T1*b* of each tank T to increase the water pressure inside the tank T to a predetermined pressure. Note that the pressure increasing step P3 may be simultaneously performed on a plurality of tanks T or may be sequentially performed on the tanks T one by one.

When the pressure increasing step P3 is sequentially performed on the tanks T one by one, water is pumped by the high-pressure pump 105 to the lower opening T1*b* of the tank T whose pressure is increased first. Then, the water pressure inside the tank T whose pressure is increased first is increased to a predetermined pressure of, for example, about 105 [MPa], and then the water supply valve 111*w* and the lower valve 111*b* connected to the tank T are closed. Subsequently, the water supply valve 111*w* and the lower valve 111*b* of the water supply line 111 connected to the second tank T to be inspected are opened.

Then, water is pumped by the high-pressure pump 105 to the lower opening T1*b* of the second tank T whose pressure is increased, the water pressure inside the tank Tis increased to a predetermined pressure, and then the water supply valve 111*w* and the lower valve 111*b* connected to the tank T are closed. Thereafter, the water pressure inside the other tanks T is sequentially increased to a predetermined pressure, and the water supply valves 111*w* and the lower valves 111*b* connected to the tanks T are closed. As a result, the costly high-pressure pump 105 can be continuously operated, so that the operation efficiency can be improved.

Finally, the high-pressure pump 105 is stopped and the pressure increasing step P3 ends. When the water pressure inside the tank T detected by the pressure gauge 114*p* exceeds a predetermined pressure, for example, the high-pressure regulator 113*r* of the high-pressure return line 113 opens, and water is discharged from the water supply line 111 to the water tank 101 via the high-pressure return line 113.

Next, the draining step P4 is performed. In the draining step P4, for example, the lower valve 111*b* of the water supply line 111 closed in the pressure increasing step P3 is opened and the drain valve 116*d* of the drain line 116 is opened to lower the water pressure inside each tank T. Further, the overflow valve 1140 and the upper valve 114*t* of the overflow line 114 are opened to drain water from the lower opening T1*b* of the tank T to the drain line 116 and to introduce air into the tank T from the upper opening T1*t* of the tank T. The water drained to the drain line 116 passes through the filter 116*f* and returns to the water tank 101.

In this draining step P4, air may be pumped from the air supply unit 106 to the upper opening T1*t* of the tank T. More specifically, for example, the overflow valve 1140 of the overflow line 114 is closed, each air supply valve 115*a* of the air supply line 115 is opened, and air is pumped from the air supply unit 106 through the air supply line 115 and the upper valve 114*t* to the upper opening T1*t* of each tank T. The tank T is then removed from each of the clamps 103 and the tank inspection method TIM shown in FIG. 2 ends.

As described above, the tank inspection method TIM of the present embodiment includes the supporting step P1, the water injection step P2, the pressure increasing step P3, and the draining step P4. In the supporting step P1, the tank T is supported with the central axis Ta crossed with the horizontal plane such that the openings T1 provided at both ends in the direction along the central axis Ta of the cylindrical tank T become the upper opening T1*t* and the lower opening T1*b*. The water injection step P2 injects water into the tank T from the lower opening T1*b* of the tank T supported in the supporting step P1 and discharges air inside the tank T from the upper opening T1*t*. In the pressure increasing step P3, with the upper valve 114*t* closed, the upper valve 114*t* adapted to open and close the overflow line 114, which is the upper flow path, connected to the upper opening Tt of the tank T, the water pressure inside the tank T, filled with water in the water injection step P2, is increased to a predetermined pressure by pumping water to the lower opening T1*b*. In the draining step P4, water is drained from the lower opening T1*b* of the tank T after the pressure increasing step P3 ends.

With such a configuration, in the supporting step P1, one of the openings T1 provided at both ends in the longitudinal direction along the central axial Ta of the cylindrical tank T may be the upper opening T1*t*, and the other may be the lower opening T1*b* disposed at a position lower than the upper opening T1*t*. Thus, in the water injection step P2, by injecting water from the lower opening T1*b* into the tank T, the air inside the tank T can be efficiently discharged from the upper opening T1*t*.

Further, in the supporting step P1, by supporting the tank T with the central axial Ta of the cylindrical tank T crossed with the horizontal plane, it is possible to suppress the air accumulation inside the tank T in the water injection step P2, and it is also possible to suppress the water remaining inside the tank T in the draining step P4. Further, in the draining step P4, by draining the water inside the tank T from the lower opening T1*b*, the water injected into the tank T at the time of inspection can be efficiently drained by the action of the gravity.

Further, according to the tank inspection method TIM of the present embodiment, the water injection step P2, the pressure increasing step P3 and the draining step P4 can be implemented by the same inspection device 100, and the apparatuses required for the steps can be integrated to reduce the equipment cost. In addition, it is possible to eliminate a water injection nozzle and a drain nozzle, thereby reducing the facility cost and the time for each step. In addition, time for transferring the tank T between the steps can be reduced.

Further, in the tank inspection method TIM of the present embodiment, in the draining step P4, air is pumped to the upper opening T1*t* of the tank T. As a result, the water inside the tank T is pushed out from the lower opening T1*b* by the air pumped into the tank T through the upper opening T1*t*. Therefore, according to the tank inspection method TIM of the present embodiment, it is possible to efficiently drain the water injected into the tank T at the time of inspection.

Further, in the tank inspection method TIM of the present embodiment, the upper valve 114*t* is closed when bubbles contained in the water flowing through the overflow line 114, which is the upper flow path, are no longer detected in the water injection step P2. Thus, the air remaining inside the tank T is completely discharged and the tank T is entirely filled with water in the water injection step P2, and with such a state, the pressure increasing step P3 can be carried out.

Further, in the tank inspection method TIM of the present embodiment, the tank T to be inspected has the cylindrical body T4 which is larger in diameter than the openings T1 at both ends in the direction along the central axis Ta, and the funnel-shaped shoulder portion T5 which is provided between each of the openings T1 and the body T4 and whose diameter decreases toward each of the openings T1. In the tank inspection method TIM of the present embodiment, in the supporting step P1, the angle between the central axis Ta of the tank T and the horizontal plane is set within a predetermined angle range. As shown in FIG. 3, the predetermined angle range is an angle range that can be moved upward in the vertical direction toward the upper opening T1*t* along the route R on the inner surface of the shoulder portion T5 that connects any point P on the inner surface of the shoulder portion T5 and the upper opening T1*t* at the shortest distance.

With such a configuration, in the supporting step P1, the tank T is supported with the central axial Ta of the cylindrical tank T crossed with the horizontal plane at an angle within a predetermined angle range, and thus, it is possible to prevent air accumulation inside the tank T in the water injection step P2. Similarly, in the draining step P4, when the water inside the tank T is drained, it is possible to prevent the water from accumulating on the inner surface of the shoulder portion T5. Therefore, according to the tank inspection method TIM of the present embodiment, it is possible to efficiently drain the water injected into the tank T at the time of inspection.

As described above, according to the present embodiment, it is possible to provide the tank inspection method TIM capable of efficiently draining water injected into the tank T at the time of inspection.

Although the embodiment of the tank inspection method according to the present disclosure has been described in detail with reference to the drawings, the specific configuration is not limited to the embodiment, and any design changes or the like within a range without departing from the gist of the present disclosure are included in the present disclosure.

DESCRIPTION OF SYMBOLS

114 Overflow line (upper flow path)
114*t* Upper valve
P Any point
P1 Supporting step
P2 Water injection step
P3 Pressure increasing step
P4 Draining step
R Route
T Tank
T1 Opening
T1*t* Upper opening
T1*b* Lower opening
T4 Body
T5 Shoulder portion
Ta Central axis
TIM Tank inspection method

What is claimed is:

1. A tank inspection method comprising the steps of:

supporting a cylindrical tank, with a central axis of the tank crossed with a horizontal plane such that openings provided at both ends in a direction along the central axis of the tank become an upper opening and a lower opening;

injecting water in which water is injected into the tank from the lower opening of the tank supported in the supporting and air inside the tank is discharged from the upper opening, and the tank is filled with water by causing water overflowing from the upper opening to flow into a water tank through an overflow line;

increasing pressure in which water pressure inside the tank, filled with water in the injecting water, is increased to a predetermined pressure by pumping water to the lower opening, with an upper valve closed, the upper valve adapted to open and close an upper flow path connected to the upper opening of the tank; and draining water in which water is drained from the lower opening of the tank after the increasing pressure ends, wherein:

the overflow line is provided with an upper valve and an overflow valve in the order from the upper opening to the water tank;

an air supply line that branches from the overflow line and is supplied with air from an air supply unit is connected to the overflow line between the upper valve and the overflow valve;

the air supply line is provided with an air supply valve;

in the injecting water, the upper valve and the overflow valve are opened, and after water overflowing from the upper opening flows into the water tank through the overflow line, the upper valve is closed;

in the increasing pressure, the water pressure inside the tank is increased to a predetermined pressure with the upper valve closed; and in the draining water, the overflow valve is closed, the upper valve and the air supply valve are opened, and air from the air supply line is pumped to the upper opening of the tank.

2. The tank inspection method according to claim 1, wherein in the injecting water, the upper valve is closed when bubbles contained in water flowing through the overflow line are no longer detected.

3. The tank inspection method according to claim 1, wherein the tank comprises:

a cylindrical body which is larger in diameter than the openings at both ends in the direction along the central axis; and a funnel-shaped shoulder portion which is provided between each of the openings and the body and whose diameter decreases toward each of the openings, wherein in the supporting, an angle between the central axis of the tank and the horizontal plane is set within a predetermined angle range that can be moved upward in a vertical direction toward the upper opening along a route on an inner surface of the shoulder portion that connects any point on the inner surface of the shoulder portion and the upper opening at a shortest distance.

* * * * *